United States Patent [19]

Dawson

[11] Patent Number: 4,546,931

[45] Date of Patent: Oct. 15, 1985

[54] METHOD AND APPARATUS FOR COILING A CONTINUOUS STRING OF MOLDED ITEMS ABOUT A VERTICAL AXIS

[75] Inventor: C. Bruce Dawson, Winchester, Va.

[73] Assignee: O'Sullivan Corporation, Winchester, Va.

[21] Appl. No.: 621,794

[22] Filed: Jun. 18, 1984

Related U.S. Application Data

[63] Continuation-in-part of Ser. No. 481,825, Apr. 4, 1983, Pat. No. 4,496,113, which is a continuation-in-part of Ser. No. 316,033, Oct. 28, 1981, Pat. No. 4,445,836.

[51] Int. Cl.$^4$ .................. B65H 17/02; B65H 25/04; B65H 75/02
[52] U.S. Cl. .................................. 242/67.2; 242/75.3; 242/74.1; 242/156.1; 226/43; 226/44
[58] Field of Search .................. 242/55, 67.1 R, 75.3, 242/68.7, 75.5, 75.51, 75.53, 156.1, 105, 74.1, 68.3, 67.2; 226/43, 44

[56] References Cited

U.S. PATENT DOCUMENTS

| 417,219 | 12/1889 | Beals | 242/68.3 |
| 2,097,142 | 10/1937 | Borton | 242/75.5 |
| 2,578,123 | 12/1951 | Bendfelt | 242/155 R |
| 3,094,295 | 6/1963 | Ward | 242/67.2 |
| 3,411,728 | 11/1968 | Hall et al. | 242/75.4 |
| 3,470,382 | 9/1969 | Tobey | 226/44 X |
| 3,561,691 | 2/1971 | Nichols | 242/55 |
| 3,974,949 | 8/1976 | Petersen | 226/44 X |
| 4,456,193 | 6/1984 | Westover | 226/44 X |

Primary Examiner—Stuart S. Levy
Assistant Examiner—Lloyd D. Doigan
Attorney, Agent, or Firm—Burns, Doane, Swecker & Mathis

[57] ABSTRACT

A plurality of continuous strings which have been formed in a molding machine are wound about vertical axes. The strings are pulled from the molding machine simultaneously by a first tensioning device which maintains the strings under tension. The strings are advanced simultaneously from the first tensioning mechanism by a first drive means. As the strings are advanced by the first drive means, they are drawn by a plurality of second tensioning mechanisms which maintain the strings under tension. The strings are wound upon respective reels which pull the strings from the second tensioning mechanisms. The reels are capable of rotating independently of one another. After a preselected number of turns of the string have been wound, a reinforcing member is clamped against an upper edge of those turns to prevent the subsequently wound outer turns from excessively radially compressing the inner turns.

18 Claims, 7 Drawing Figures

METHOD AND APPARATUS FOR COILING A CONTINUOUS STRING OF MOLDED ITEMS ABOUT A VERTICAL AXIS

BACKGROUND OF THE INVENTION

This is a continuation-in-part of my copending application Ser. No. 06/481,825, filed Apr. 4, 1983 now U.S. Pat. No. 4,496,113 which, in turn, is a continuation-in-part of my copending patent application Ser. No. 06/316,033 filed Oct. 28, 1981, now U.S. Pat. No. 4,445,836 issued May 1, 1984.

FIELD OF THE INVENTION

The present invention relates to the molding of a continuous string or chain of interconnected elements or articles connected through molded scrap connectors and, in particular, to the winding of such a string of molded items into a tight coil.

DESCRIPTION OF THE PRIOR ART

Automatic assembly techniques for assembling a plurality of different components into a single composite product are well known. These techniques are employed, for example, in the assembly of anti-theft devices, such as those clamped to a garment in a store and which are capable of setting-off an alarm when passed through a suitable sensor, e.g., located at the door of the store.

In the molding of small parts in large quantities for automatic assembly, it is conventional to mold a predetermined number of parts in a single operation of the mold, after which the group of parts may be handled as a unit by virtue of their being connected together through scrap runners. The handling of such units during automatic assembly is, however, generally very inefficient in that it requires at least one person untangling and/or orienting the units and then feeding the individual units to the automatic assembly system. Any means of facilitating the automatic assembly of different parts, e.g., by making the feeding of parts to the assembly system more automatic and trouble free of entanglement and the need for correctly orienting the units, would be of great value to the industry.

In the molding of small parts, the molding of a continuous string of parts in spaced relationship and connected via scrap runners is known.

A problem associated with the winding of a continuous string of molded articles, however, is that the articles often cause problems during the unwinding due to the coil sagging and the string possibly becoming entangled. Thus, while shipment of the wound spool of articles to the assembler is facilitated, the package in itself does not facilitate the automatic assembly of the parts since the wound package must constantly be monitored due to the problems encountered in unwinding from the sagging of the coil of parts and/or entanglement of the parts. The problems encountered often result in stoppages and delays of the assembly line, and can also get so bad as to require that each part be cut from the coil and again be oriented and fed by hand to the assembly machine.

In my afore-mentioned copending applications, there is disclosed a winding apparatus in which the continuous string is wound upon a reel which is periodically rotated about a horizontal axis. Between the periods of reel rotation, the string is accumulated on a tensioner/accumulator apparatus which takes-up slack in the string. After a preselected amount of slack has been taken-up, the reel drive motor is actuated to wind-up the string which has been accumulated. The tensioner biases the string taut with a given force, and then reduces that force during a wind-up operation whereby the tension imposed on the string is insufficient to break the string.

Although such a mechanism has operated satisfactorily, room for improvement remains. For example, when winding about a horizontal axis, the portion of the string located at the bottom-most portion of the coil may sag under the effect of gravity, especially when the coil contains a substantial number of turns. This can result in the molded articles in the string becoming interlocked with each other. Such interlocking can produce deformation of the articles and also interfere with a subsequent continuous unwinding of the coil.

It is, therefore, an object of the present invention to minimize or obviate problems of the above-discussed type.

A further object is to enable a continuous string of molded articles to be smoothly wound upon a reel.

Another object is to prevent the inner turns of a coil from being excessively compressed by the outer turns.

An additional object is to enable a plurality of simultaneously formed strings to be coiled without requiring a synchronous operation of the coiling devices.

Yet another object is to enable a string of molded items to be coiled without being excessively tensioned or compressed.

SUMMARY OF THE INVENTION

These objects are achieved by the present invention which relates to an apparatus and a process for winding a plurality of continuous strings of items which are formed in a mold. The apparatus comprises a first tensioning mechanism for pulling the strings from the mold. The first tensioning mechanism includes a first movable member engaging the strings, and a first biasing device for urging the first movable member in a first direction to pull the strings simultaneously from the mold and maintain a tension thereon. A first motor-drive mechanism is disposed downstream of the first tensioning mechanism and is engageable with the strings to simultaneously advance them to produce movement of the first movable member in a second direction opposite the first direction. A first switch is arranged adjacent the first movable member for activating the first drive mechanism in response to the pulling of preselected amounts of the strings from the mold by the first movable member, and for deactivating the first drive mechanism in response to the preselected amounts of strings being advanced by the first drive member. A plurality of second tensioning mechanisms are disposed downstream of the first drive mechanism for engaging respective ones of the strings. Each second tensioning mechanism comprises a second movable member engaging its associated string, and a second biasing device for urging the second movable member in a third direction to draw its associated string as the latter is advanced by the first drive mechanism and to maintain tension on such string. A plurality of winding reels are respectively associated with the plurality of second tensioning mechanisms. Each reel is rotatable about a generally vertical axis and includes a table upon which the associated string is supported as it is being wound into a coil upon the reel. Each reel also includes a second drive mechanism for rotating the reel to produce movement of the associated second movable member in a fourth direction opposite the third direction. A plurality of second switches are respectively disposed adjacent the second movable members for activating the second drive mechanisms of the associated reels in response to the drawing of a predetermined amount of the associated string by each second movable member, and for deactivating the second drive mechanism of the associated reel in response to the predetermined amount of the associated string being wound by the reel.

The present invention also involves a reel for coiling a continuous string of molded items. The reel comprises a horizontal table rotatable about a vertical axis and upon which a lower edge of the string is supported as it is coiled about the vertical axis. A drive motor is provided for rotating the table. A reinforcing member is clampable against an upper edge of a preselected number of inner turns of the string to resist tightening of such inner turns by subsequently wound outer turns.

The present invention also envisions a method of winding a plurality of continuous strings which are formed in a molding machine. The method comprises the steps of pulling the strings from the molding machines simultaneously by a first tensioning mechanism which maintains the strings under tension. The strings are advanced simultaneously from the first tensioning mechanism by an intermittently operating first drive mechanism after preselected amounts of the strings have been pulled from the molding machine. As the strings are advanced by the first drive mechanism, the strings are taken-up by a plurality of second tensioning mechanisms which are associated with respective ones of the strings and which maintain such strings under tension. The strings are wound, respectively, onto a plurality of reels after predetermined amounts of the strings have been taken-up by the second tensioning mechanisms. The strings are wound by intermittently rotating each reel about a vertical axis to wind the associated string upon a horizontal table. The reels are rotatable independently of one another.

Preferably, a reinforcing member is clamped against the tops of inner turns of each string to resist tightening of the inner turns by subsequently wound outer turns.

THE DRAWINGS

The objects and advantages of the invention will become apparent from the following detailed description of a preferred embodiment thereof in connection with the accompanying drawings in which like numerals designate like elements, and in which.

DETAILED DESCRIPTION OF A PREFERRED EMBODIMENT OF THE INVENTION

Figure 1:
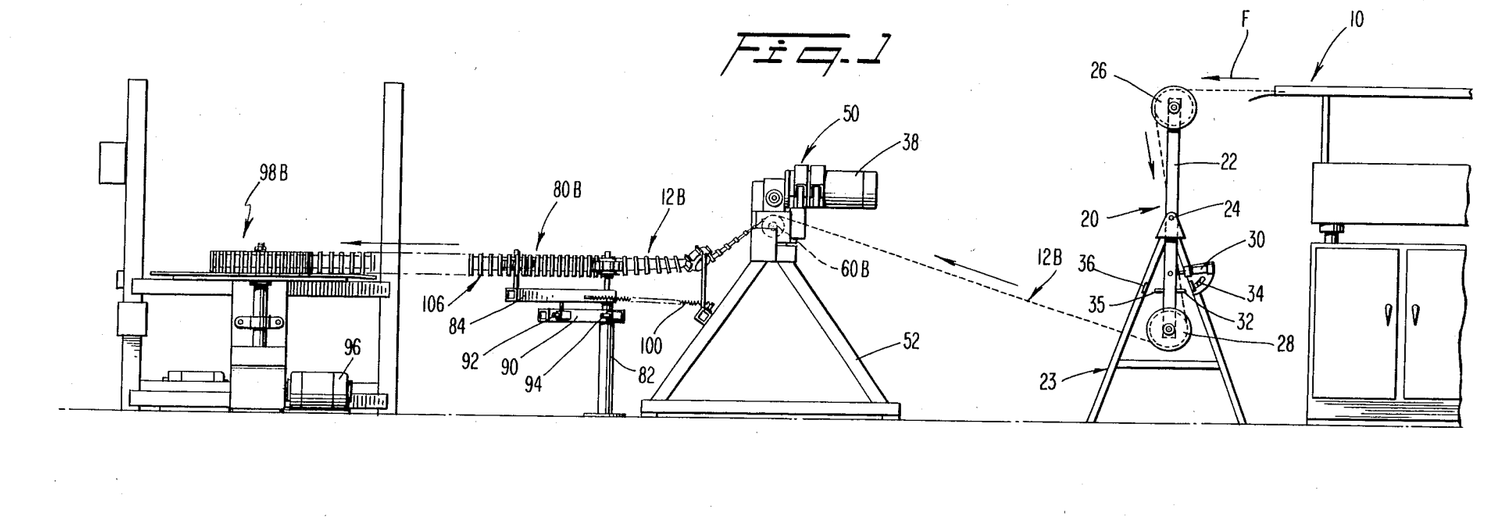
FIG. 1 is a side elevational view of a coiling stand upon which a plurality of continuous strings of molded items are pulled from a molding machine and coiled about vertical axes.
Figure 1A:
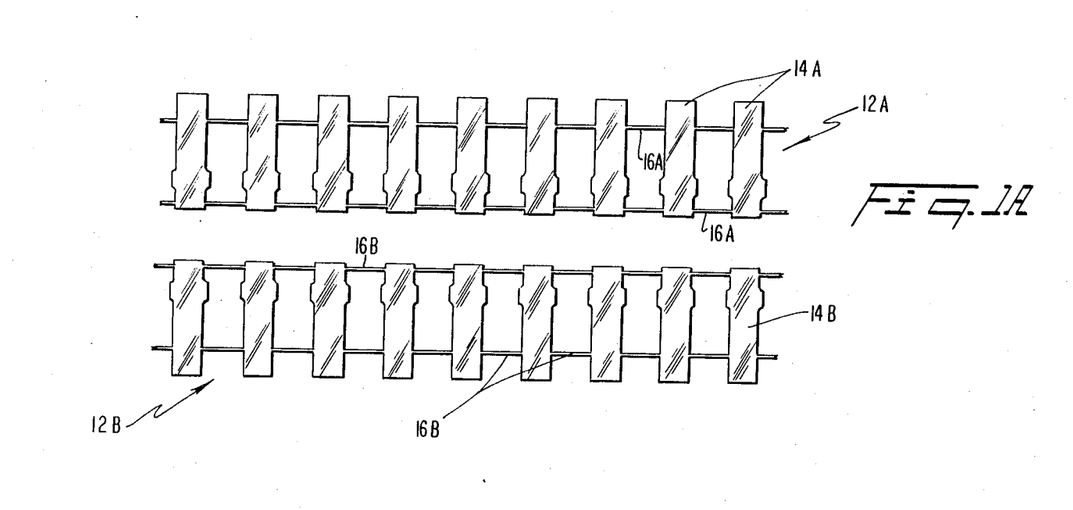
FIG. 1A is a plan view of the molded strings.
Figure 2:
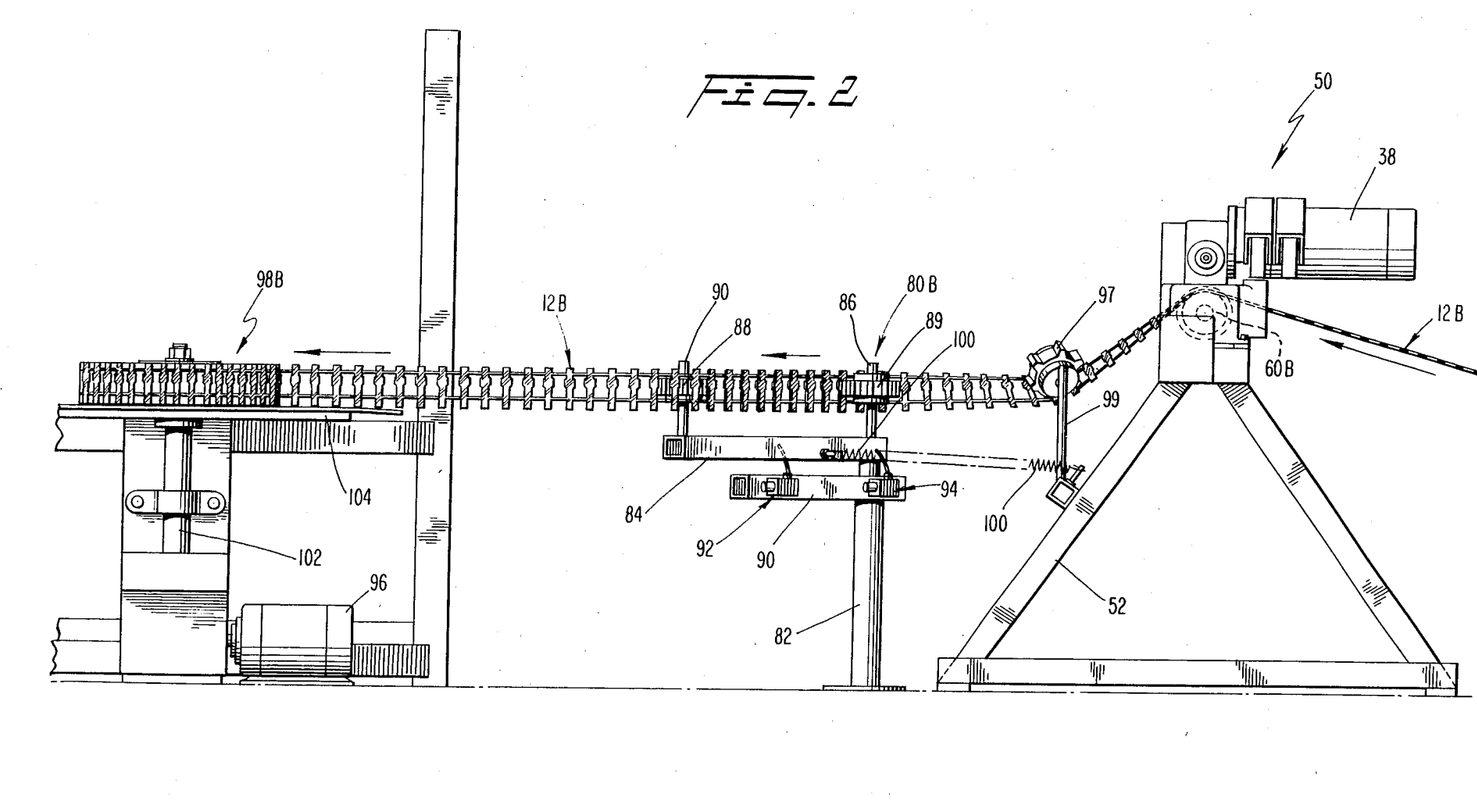
FIG. 2 is an enlarged side elevational view of a portion of the stand depicted in FIG. 1.

In FIG. 1 there is depicted an injection molding machine 10 which can be of a commercially available type. The machine molds a pair of continuous strings 12A, 12B (FIGS. 1, 3) which each comprises a plurality of longitudinal spaced transversely extending items 14A or 14B interconnected by integral runners 16A or 16B. The manner in which the strings are molded and pulled from the mold cavities is explained in detail in my aforementioned copending applications. As also explained in those copending applications, the strings 12A, 12B are pulled from the molding machine by a tensioning device 20. The tensioning device 20 comprises a bar 22 which is freely pivotably mounted on a frame 23 by means of a horizontal axle 24 located intermediate the ends of the bar 22. At an upper end of the bar are rotatably mounted a pair of coaxial pulleys 26 (only one upper pulley depicted). At a lower end of the bar are rotatably mounted a pair of coaxial pulleys 28 (only one lower pulley depicted). Each of the upper pulleys 26 guidingly receives one of the strings 12A, 12B and each of the lower pulleys 28 guidingly receives one of the strings. Hence, each string extends around one each of the upper and lower pulleys in a generally S-shaped pattern.

The bar 22 is biased in a given direction (counterclockwise as viewed in FIG. 1) by an air cylinder 30. While being biased in that manner, the bar exerts a force F on the strings 12A, 12B tending to pull them from the molding machine. Thus, each time that a batch of items are removed from the mold cavities by an indexing mechanism (not shown), the bar 22 rotates a given amount to remove sections of the strings from the molding machine and maintain a uniform tension thereon. This procedure continues until a stop 32 on the bar contacts and actuates a microswitch 34 on the frame 23. Actuation of the switch 34 produces start-up of a motor 38 to advance the strings, as will be hereinafter discussed, and also reduces the pressure which the air cylinder 30 imposes on the bar 22.

Figure 3:
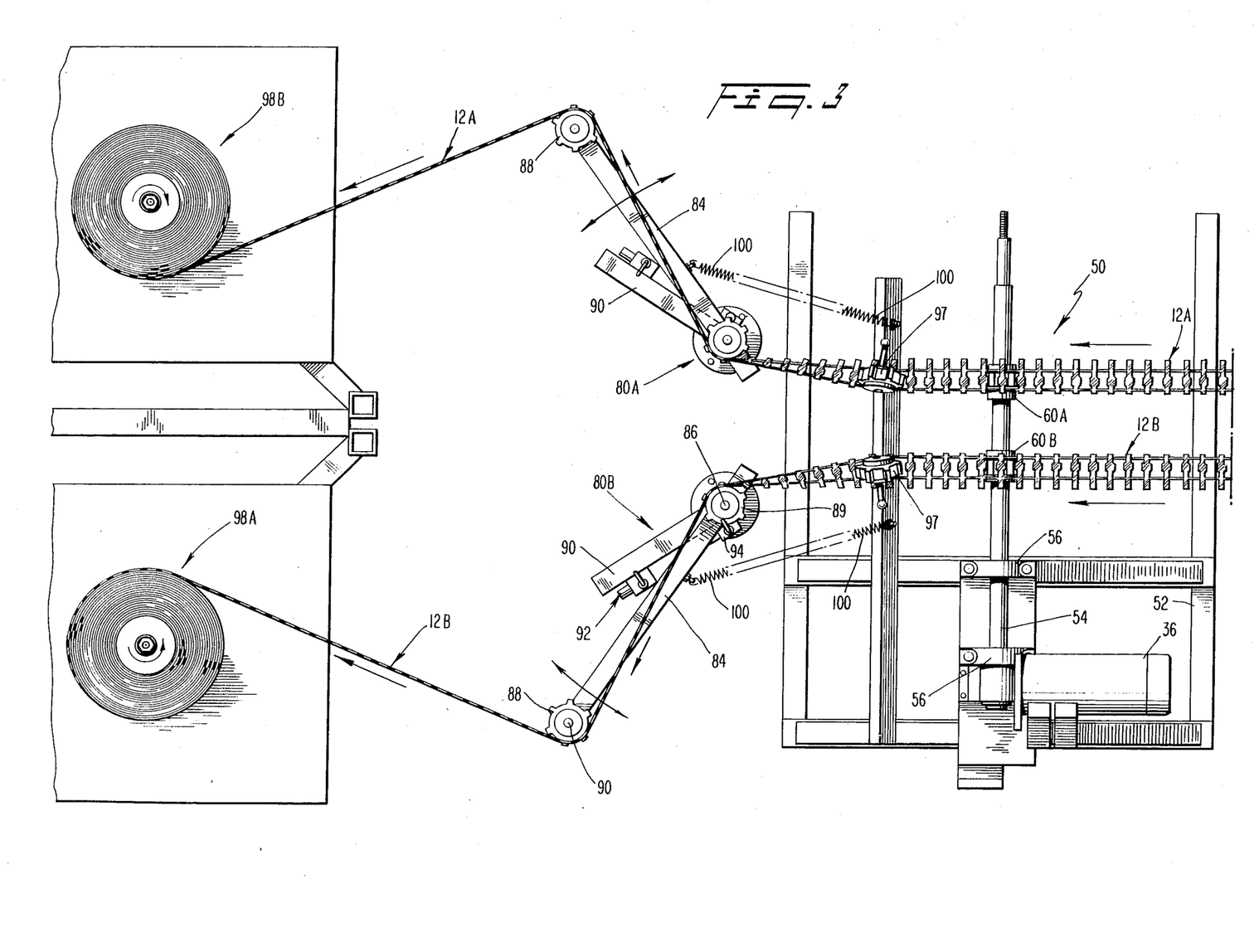
FIG. 3 is a plan elevational view of the stand depicted in FIG. 2 as coiling operations proceed.
Figure 4:
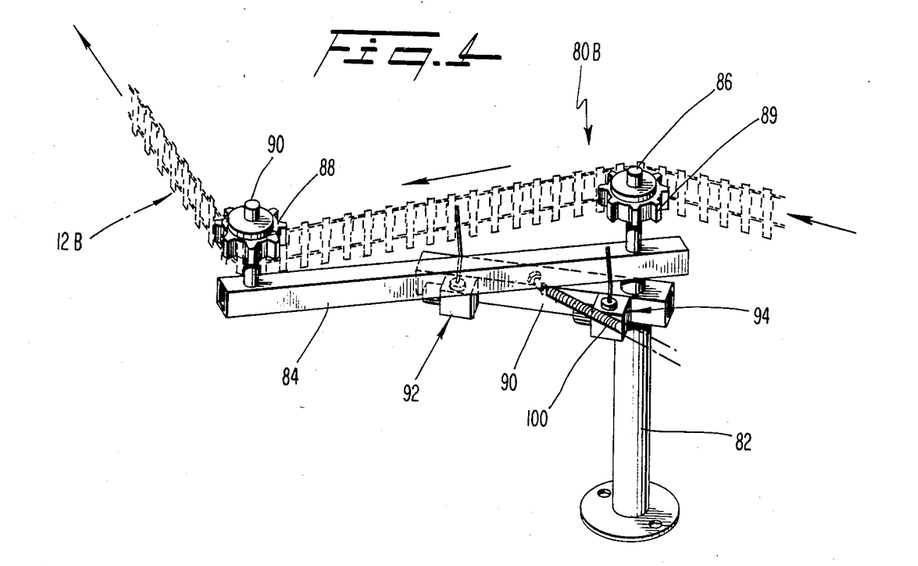
FIG. 4 is a perspective view of a portion of the stand.

The motor 38 comprises part of a feeding device 50 which is situated downstream of the tensioning device 20 (FIGS. 1, 3). The feeding device 50 comprises a frame 52 upon which the motor 38 is mounted. The motor 36 is connected in any suitable fashion to a drive shaft 54 which is mounted in bearings 56 for rotation about its own longitudinal axis. Fixedly mounted on the drive shaft 54 are a pair of coaxial toothed sprocket wheels 60A, 60B over which the strings 12A, 12B, respectively, pass. The teeth of the sprocket wheels mesh with the items of the strings to apply forces thereto for advancing the strings.

The motor 36 is driven intermittently, i.e., operation begins when the stop 32 of the bar 22 engages the microswitch 34 and ends when a stop 35 on the bar 22 engages a microswitch 36. During the period of operation, the sprocket wheels 60A, 60B advance the strings 12A, 12B thereby producing clockwise rotation of the bar 22 as the strings are drawn therefrom.

Figure 6:
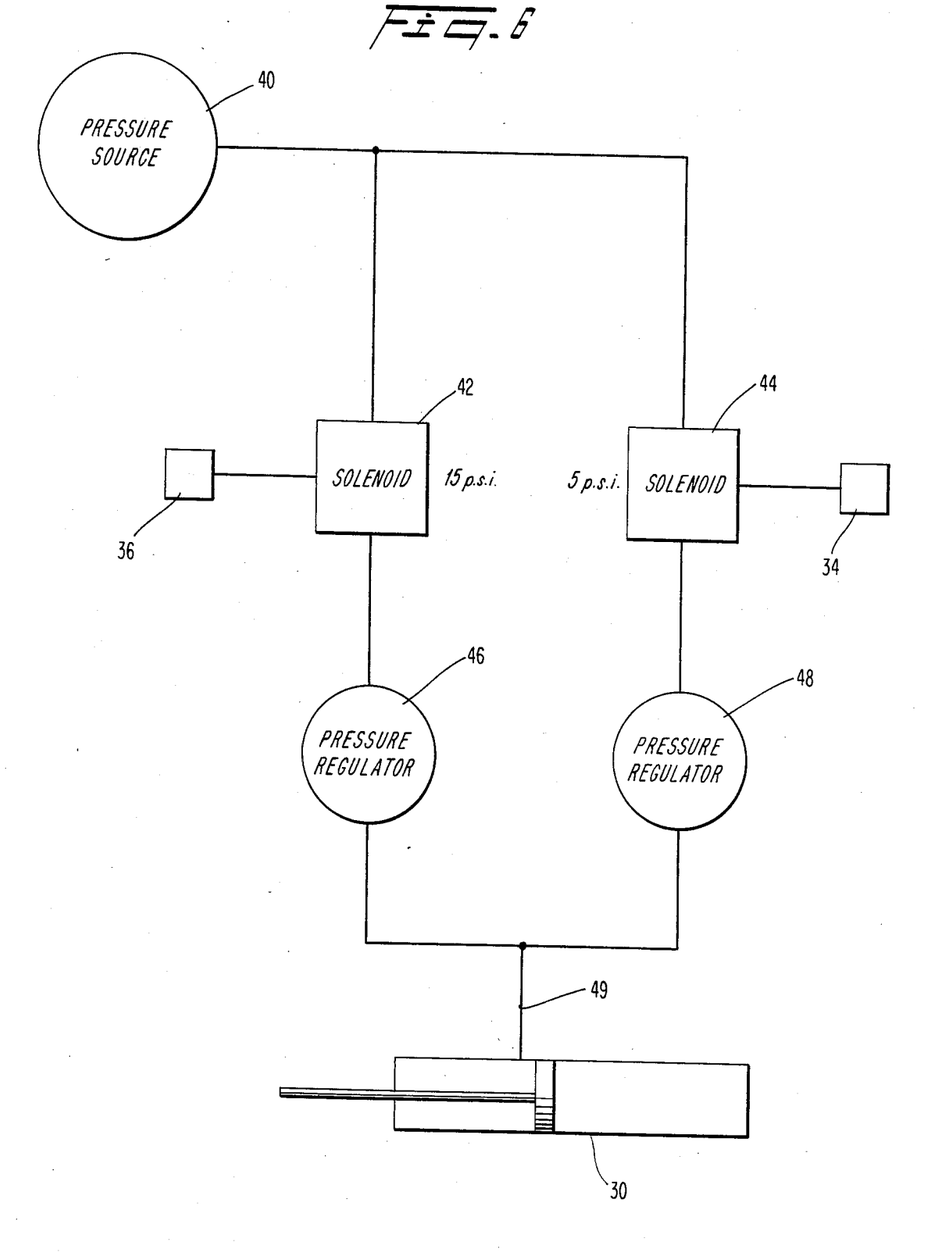
FIG. 6 is a schematic view of a pressure regulation system employed in a tensioning mechanism according to the present invention.

A system for achieving a variable bias on the air cylinder 30 is depicted in FIG. 6. That system includes a source of pressurized air 40 which can include a power driven pump. The air source 40 communicates in parallel with first and second electrically actuated solenoids 42, 44. The first solenoid 42 is electrically coupled to the microswitch 36 and the second microswitch is electrically coupled to the microswitch 34. The first and second solenoids communicate with first and second air pressure regulators 46, 48, respectively, which can be of any suitable type, such as that marketed by Arrow Corp. under Model. No. 1611A-18REGCD. The outlets of the pressure regulators 46, 48 communicate with a common air line 49 which feeds pressurized air to the rod side of the air cylinder 30. The piston side of the cylinder is open to atmosphere by way of a needle valve (not shown).

The first pressure regulator 46 is preferably set to supply air at a pressure of about 15 p.s.i., and the second pressure regulator 48 is preferably set to supply air at a pressure of about 5 p.s.i.

In practice, when a string-advance sequence terminates as a result of the stop 35 tripping the microswitch 36, the first solenoid 42 is activated and the second solenoid 44 is deactivated. Accordingly, the higher pressure air (15 p.s.i.), in lieu of lower pressure air (5 p.s.i.), is supplied to the rod side of the air cylinder 30. The subsequent pulling of new items from the mold by the bar 22 results in the bar 70 rotating (counterclockwise in FIG. 1) under the higher pressure to take-up any slack which would otherwise occur in the string. When a new string-advance sequence is started as a result of the stop 32 tripping the microswitch 34, the first solenoid 42 is deactivated and the second solenoid 46 is activated. Thus, during the string-advance sequence, the air cylinder 30 is subjected to the lower pressure (5 p.s.i.). This assures that the strings will not be broken, especially at the instant when the sprocket wheels 60A, 60B first tension the strings.

As the strings 12A, 12B are advanced by the sprocket wheels 60A, 60B they are kept taut by a pair of secondary tensioning devices 80A, 80B. Each secondary tensioning device is of identical construction and thus only one of the devices 80B will be explained in detail. The secondary tensioning device 80B includes a stationary upstanding mounting post 82 upon which is pivotably mounted an arm 84. One end of the arm 84 contains a vertical hole which is mounted over an axle portion 86 of the port 82 to permit the arm 84 to swing freely in a horizontal plane. Also mounted on the axle 86 for free rotation thereon is a first sprocket wheel 89 disposed above the arm 84. Carried on an end of the arm 84 opposite the axle 86 is a second sprocket wheel 88 which is freely rotatable about a vertical pin 90. The first and second sprocket wheels are arranged to lie in a common horizontal plane. The string 12B extends around the two sprocket wheels 88, 89 in an S-shaped configuration.

Also mounted on the post 82 is a fixed beam 90 positioned below the arm 84. The beam 90 carries first and second microswitches 92, 94 adapted to be engaged by the arm 84 at the ends of its range of pivotal travel to either actuate (by switch 94) or deactivate (by switch 92) a motor 96 which drives a wind-up reel 98B, as will be discussed hereinafter.

A coil tension spring 100 is connected between the arm 84 and the frame 52 for continuously biasing the arm 84 toward the second microswitch 94, i.e., toward a position maintaining the string 12B taut. Thus, as the string 12B is advanced by the driven sprocket wheel 60B, the arm 84 is rotated by the apring 100 to maintain tension in the string 12B by taking-up same.

Situated between the drive sprocket wheel 60B and the second freely rotatable sprocket wheel 89, is a freely rotatable guide sprocket wheel 97 which is mounted on the frame 52 by means of a bracket 99. The rotary axis of the guide wheel 97 is inclined relative to horizontal to guide the string 12B as the latter travels through a transition phase from a horizontal orientation to a vertical orientation. That is, as the string 12B travels from the molding machine 10 to the drive sprocket 60B, it is oriented such that the items 14B are horizontal. Thereafter, however, the items 14B become oriented vertically.

The reel 98B comprises a center hub (not shown) which is connected for rotation to a vertical shaft 102, the latter being driven periodically by the motor 96. A leading end of the string 12B is connected to the hub so that the string is coiled in response to rotation of the shaft 102.

The hub is mounted on a horizontal table 104 which also rotates with the shaft. As the string 12B is coiled, it is supported along its lower edge 106 upon the table 104.

The motor 96 is connected to the second or motor-activate microswitch 94 so as to be activated when the arm 84 actuates that second microswitch 94. This causes the string 12B to be coiled and, in so doing, the string 12B produces pivotal movement of the arm 84 against the bias of the spring 100. Coiling ceases temporarily when the arm 84 actuates the first, or motor-deactivate microswitch 92.

Figure 5:
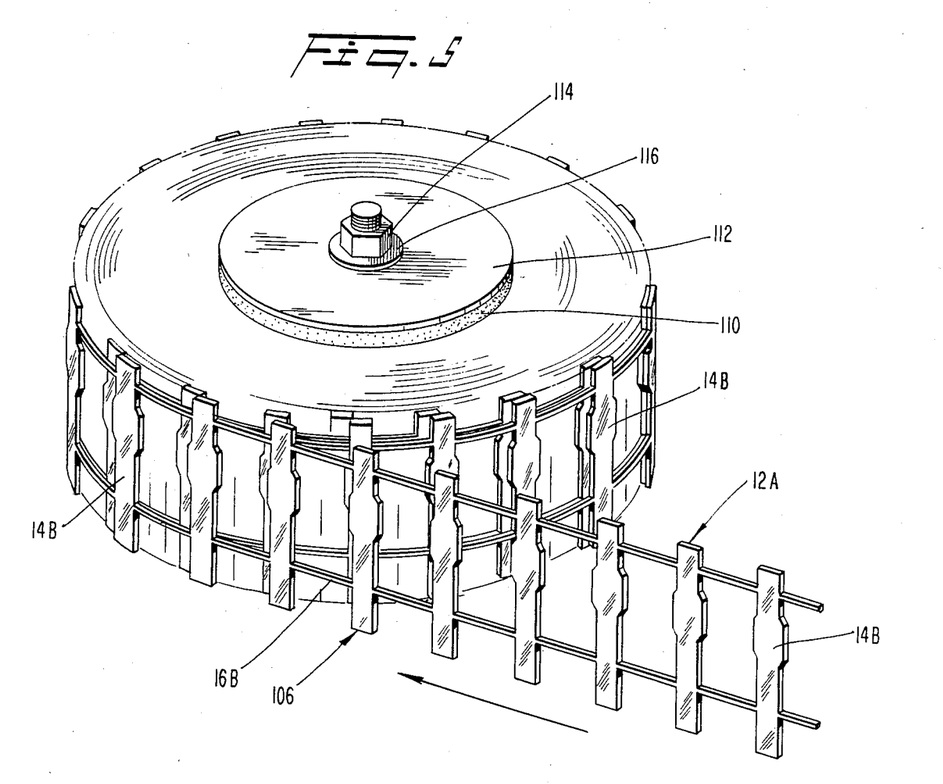
FIG. 5 is a perspective view of the molded items as they are being coiled.

As coiling progresses, it is possible that the inner turns of the coil may be too tightly radially compressed as the outer turns are wound. This can result in a deformation of the items 16. To eliminate this problem, a reinforcing member 110 (FIG. 5) is applied to the coil after a preselected number of turns have been wound, i.e., after the coil diameter corresponds to the diameter of the reinforcing member. The latter is formed of a generally elastic material such as a foamed plastic material which is covered by a disk 112 of relatively stiff material. A nut 114 and washer 116 are provided to force the disk 112 against the reinforcing member 110 in a longitudinal direction (i.e., parallel to the axis of rotation), whereby the latter is compressed between the disk and the upper edge of the coil. Thus, the coil is braced against being significatnly further tightened as the winding continues.

The other tensioning device 80A associated with the other string 12A is identically structured as the tensioning device 80B and operates in the same manner to tension the string and to intermittently activate and deactivate a coiling reel 98A associated therewith. The devices 80A, 80B are independently actuable, however. That is, an arm 84A of the former can pivot independently of the arm 84B. This avoids the need to take special measures to assure that the reels 98A, 98B rotate in perfect synchronism. That is, either of the reels 98A, 98B can rotate while the other is stopped, or both reels can rotate simultaneously or be inactive simultaneously.

IN OPERATION, the strings 12A, 12B are pulled simultaneously from the molding machine by the initial tensioning device 20 under the influence of the higher force imposed by the air cylinder 30 until the stop 32 actuates the microswitch 34. At that time, the motor 38 is actuated to rotate the drive sprocket wheels 60A, 60B to simultaneously advance both strings 12A, 12B and thereby rotate the bar 22 until the stop 35 actuates the microswitch 36 to stop the motor 38.

The advancing strings 12A, 12B are maintained in a tensioned condition downstream of the drive sprocket wheels 60A, 60B by the secondary tensioning mechanisms 80A, 80B. When the tensioning arm 84 reaches a position of its spring-induced pivotal movement corresponding to a maximum take-up of the associated string, as depicted in FIG. 3, it engages the microswitch 94 to activate the respective coiling motor 96. Then, the string is coiled until the arm 84 is swung into contact with the microswitch 92. It will be appreciated that the coiling motors 96 for each of the winders 98A, 98B can be activated independently of the other, so that the strings 12A, 12B can be coiled independently of one another.

It will be appreciated, then, that the problems associated with coiling about a horizontal axis are eliminated by the present invention wherein coiling takes place about a vertical axis. That is, there occurs no sagging of the coil as can occur during horizontal-axis winding, because the string is continuously supported along its lower edge by the table 104.

Furthermore, the inner turns of the coil cannot be excessively radially compressed by the outer turns because the reinforcing disk 112 applies longitudinal forces to the inner coils to resist radial compression by the outer turns.

The coiling of the strings 12A, 12B can take place independently of each other, so there is no need to provide expensive equipment for synchronizing the speeds of the winder motors 96.

The pressure regulation system depicted in FIG. 6 assures that the strings will not be excessively tensioned when being advanced by the sprocket wheels 60A, 60B.

Although the present invention has been described in connection with a preferred embodiment thereof, it will be appreciated by those skilled in the art that additions, modifications, substitutions, and deletions not specifically described, may be made without departing from the spirit and scope of the invention as defined in the appended claims.

What is claimed is:

1. Apparatus for winding a plurality of continuous strings of items which are formed in a mold, said apparatus comprising:
a first tensioning means for pulling said strings from said mold and including:
a first movable member engaging said strings;
first biasing means for urging said first movable member in a first direction to pull said strings simultaneously from the mold and maintain a tension thereon;
first motor-driven drive means disposed downstream of said first tensioning means and being engageable with said strings to simultaneously advance said strings to produce movement of said first movable member in a second direction opposite said first direction;
first switch means arranged adjacent said first movable member for activating said first drive means in response to the pulling of preselected amounts of said strings from the mold by said first movable member and for deactivating said drive means in response to said preselected amounts of said strings being advanced by said first drive means;
a plurality of second tensioning means disposed downstream of said first drive means for engaging respective ones of said strings;
each said second tensioning means comprising:
a second movable member engaging its associated string;
second biasing means for urging said second movable member in a third direction to take-up its associated string as the latter is advanced by said first drive means and to maintain tension on such string;
a plurality of winding reels respectively associated with said plurality of second tensioning means, each reel being rotatable about a generally vertical axis and including:
a table upon which the associated string is supported as it is being wound into a coil upon said reel; and
second drive means for rotating said reel to advance the associated string and produce movement of the associated second movable member in a fourth direction opposite said third direction;
a plurality of second switch means respectively disposed adjacent said second movable members for activating said second drive means of the associated reels in response to the drawing of a predetermined amount of the associated string by such second movable member, and for deactivating said second drive means of the associated reel in response to said predetermined amount of the associated string being wound by the reel.

2. Apparatus according to claim 1, wherein each of said second movable members is movable independently of each other, and each of said second drive means being activatable independently of each other.

3. Apparatus according to claim 1, wherein said first tensioning means comprises a first arm pivotable about a horizontal axis intermediate its ends, a plurality of pulleys mounted at each said end and guidingly engaging said plurality of strings.

4. Apparatus according to claim 3, wherein said first biasing means comprises a fluid cylinder.

5. Apparatus according to claim 4, wherein said first biasing means biases said first arm in said first direction with a first force when said first drive means is deactivated and with a second, weaker force when said first drive means is activated.

6. Apparatus according to claim 3, including a frame upon which said first arm is mounted, said first switch means being mounted on said frame.

7. Apparatus according to claim 1, wherein said first drive means comprises a plurality of sprocket wheels mounted on a common drive shaft.

8. Apparatus according to claim 1 including a plurality of guide wheels disposed between said first drive means and respective ones of said second tensioning means, said guide wheels each being freely rotatable about an axis inclined relative to horizontal to guide the associated string as the latter undergoes a transition from a horizontal orientation to a vertical orientation.

9. Apparatus according to claim 1, wherein each said second tensioning means comprises a second arm pivotable about a vertical axis, guide wheel means mounted on said second arm and around which the associated string passes.

10. Apparatus according to claim 9, wherein said second biasing means comprises a spring.

11. Apparatus according to claim 9, wherein said guide wheel means comprises a first guide wheel means disposed coaxially with the pivot axis of said second arm, and a second guide wheel mounted at an end of said arm opposite said pivot axis.

12. Apparatus according to claim 1, wherein each said reel comprises a reinforcing member engageable with a preselected number of inner turns of the coil at an edge of the string opposite the edge supported on said table, to resist tightening of the inner turns by sequently wound outer turns.

13. Apparatus according to claim 12, wherein said reinforcing member has a diameter corresponding to that of said preselected number of inner turns.

14. Apparatus according to claim 12, wherein said reinforcing member is resilient.

15. Apparatus according to claim 14, wherein said reinforcing member is elastically resilient.

16. A method of winding a plurality of continuous strings which are formed in a molding machine, comprising the steps of:
pulling said strings from said molding machine simultaneously by a first tensioning means which maintains said strings under tension;
advancing said strings simultaneously from said first tensioning means by an intermittently operating first drive means after preselected amounts of said strings have been pulled from the molding machine;
drawing said strings as the latter are advanced by said first drive means, by a plurality of second tensioning means which are associated with respective ones of said strings and which maintain such strings under tension;
winding said strings, respectively, onto a plurality of reels after predetermined amounts of said strings have been taken-up by said second tensioning means;
said winding step including intermittently rotating each said reel about a vertical axis to wind the associated string upon a horizontal table, said reels being rotatable independently of one another.

17. A method according to claim 16 including the step of clamping a reinforcing member against the tops of inner turns of each string to resist tightening of said inner turns by subsequently wound outer turns.

18. A method of winding a continuous string comprising the steps of:
rotating a reel about a vertical axis to wind said string about said axis and upon a horizontal table of said reel,
clamping a reinforcing member against the tops of inner turns of said strip after a plurality of such inner turns have been wound, and
winding outer turns of said string around said inner turns while said reinforcing member resists tightening of said inner turns.

* * * * *